US011821482B2

(12) United States Patent
Philpott et al.

(10) Patent No.: US 11,821,482 B2
(45) Date of Patent: Nov. 21, 2023

(54) BRAKE ASSEMBLY AND METHOD OF ADJUSTMENT

(71) Applicant: ArvinMeritor Technology, LLC, Troy, MI (US)

(72) Inventors: Daniel Philpott, Goodrich, MI (US); Brian Bellemore, Pointe-aux-Roches (CA)

(73) Assignee: ArvinMeritor Technology, LLC, Troy, MI (US)

( * ) Notice: Subject to any disclaimer, the term of this patent is extended or adjusted under 35 U.S.C. 154(b) by 581 days.

(21) Appl. No.: 17/025,869

(22) Filed: Sep. 18, 2020

(65) Prior Publication Data

US 2022/0090643 A1    Mar. 24, 2022

(51) Int. Cl.
| F16D 55/02 | (2006.01) |
| F16D 65/56 | (2006.01) |
| F16D 55/2265 | (2006.01) |
| F16D 65/00 | (2006.01) |
| F16D 65/18 | (2006.01) |
| F16D 121/14 | (2012.01) |

(52) U.S. Cl.
CPC ....... F16D 65/567 (2013.01); F16D 55/2265 (2013.01); F16D 65/0068 (2013.01); F16D 65/18 (2013.01); F16D 2121/14 (2013.01)

(58) Field of Classification Search
CPC .... F16D 65/567; F16D 65/66; F16D 65/0068; F16D 65/18
See application file for complete search history.

(56) References Cited

U.S. PATENT DOCUMENTS

| 3,900,084 | A |   | 8/1975  | Farr |
| 4,159,754 | A |   | 7/1979  | Airheart et al. |
| 4,394,890 | A | * | 7/1983  | Kleinhagen, Jr. ..... F16D 65/567 |
|           |   |   |         | 188/71.9 |
| 4,491,203 | A |   | 1/1985  | Monick |
| 4,620,617 | A |   | 11/1986 | Weber |
| 4,690,253 | A |   | 9/1987  | Weber |
| 4,958,654 | A |   | 9/1990  | Hoffman, Jr. et al. |
| 5,664,646 | A | * | 9/1997  | Bejot ..................... F16D 65/18 |
|           |   |   |         | 188/71.9 |
| 6,276,494 | B1 |  | 8/2001  | Ward et al. |
| 6,354,407 | B1 |  | 3/2002  | Heinlein et al. |
| 6,607,059 | B1 |  | 8/2003  | Kapaan et al. |
| 6,659,236 | B1 |  | 12/2003 | Clark et al. |

(Continued)

FOREIGN PATENT DOCUMENTS

| CN | 106870603 A     | 6/2017 |
| DE | 102008037774 B3 | 2/2010 |

(Continued)

OTHER PUBLICATIONS

Extended European Search Report dated Feb. 17, 2022, for related European Appln. No. 21196966.2; 10 Pages.

(Continued)

Primary Examiner — Nicholas J Lane
(74) Attorney, Agent, or Firm — Brooks Kushman PC (57) ABSTRACT

A brake assembly and a method of adjusting a brake assembly. A tool may be insertable through a through hole in a caliper housing and into a shaft cavity of a shaft of a wear adjuster mechanism that is configured to adjust a running clearance of a brake pad assembly.

20 Claims, 7 Drawing Sheets

(56) References Cited

U.S. PATENT DOCUMENTS

| | | |
|---|---|---|
| 6,691,837 B1 | 2/2004 | Kapaan et al. |
| 9,599,177 B2 | 3/2017 | Yasui et al. |
| 2003/0085082 A1 | 5/2003 | Severinsson et al. |
| 2003/0173164 A1 | 9/2003 | Angerfors |
| 2005/0284709 A1 | 12/2005 | Sandberg |
| 2012/0325596 A1 | 12/2012 | Malki et al. |
| 2013/0008749 A1 | 1/2013 | Sandberg et al. |
| 2013/0256076 A1 | 10/2013 | Malki et al. |
| 2015/0354645 A1 | 12/2015 | Cann |
| 2019/0024740 A1 | 1/2019 | Taylor et al. |
| 2019/0024742 A1* | 1/2019 | Taylor ................. F16D 65/0025 |
| 2019/0063530 A1* | 2/2019 | Kulkarni ............... F16D 55/227 |
| 2019/0331181 A1 | 10/2019 | Kulkarni et al. |
| 2019/0331184 A1 | 10/2019 | Taylor et al. |
| 2019/0331185 A1 | 10/2019 | Shah et al. |

FOREIGN PATENT DOCUMENTS

| | | |
|---|---|---|
| EP | 0190453 A2 | 8/1986 |
| GB | 2097497 A | 11/1982 |
| GB | 2192033 A | 12/1987 |
| GB | 2474301 A | 4/2011 |

OTHER PUBLICATIONS

1 First Office Action dated Sep. 18, 2023, for related Chinese Appln. No. 202111094911.1; 9 Pages.

* cited by examiner

BRAKE ASSEMBLY AND METHOD OF ADJUSTMENT

TECHNICAL FIELD

This disclosure relates to a brake assembly and a method of adjusting the brake assembly.

BACKGROUND

A brake assembly is disclosed in U.S. Patent Publication No. 2019/0024740.

SUMMARY

In at least one embodiment, a method of adjusting a brake assembly is provided. The method may include inserting a tool through a hole in a caliper housing and into a shaft cavity of a shaft of a wear adjuster mechanism that may be configured to adjust a running clearance of a brake pad assembly. The shaft may be at least partially received inside a piston. The piston may be rotatable about an axis and may be at least partially received inside a tappet that is adapted to engage the brake pad assembly. The tool may engage an end cap that may be fixedly mounted to the piston. The tool may be rotated to rotate the piston to manually adjust a position of the tappet with respect to the piston. The tool may be removed from the shaft cavity and the caliper housing after rotating the tool.

In at least one embodiment, a brake assembly is provided. The brake assembly may include a caliper housing, a tappet, a piston, an end cap, and a wear adjuster mechanism. The caliper housing may have a cavity and a hole that may extend from the cavity. The tappet may be moveable along an axis with respect to the caliper housing and may be adapted to engage a brake pad assembly. The piston may be rotatable about the axis and may be at least partially received in the tappet. The piston and tappet may have mating threads. The end cap may be fixedly mounted to the piston. The wear adjuster mechanism may be at least partially received inside the piston. The wear adjuster mechanism may include a shaft that may be rotatable about the axis. The shaft may define a shaft cavity. The shaft cavity may extend from a first end of the shaft that faces toward the end cap to a second end of the shaft that is disposed opposite the first end. The shaft cavity may extend further from the axis at the second end than at the first end.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
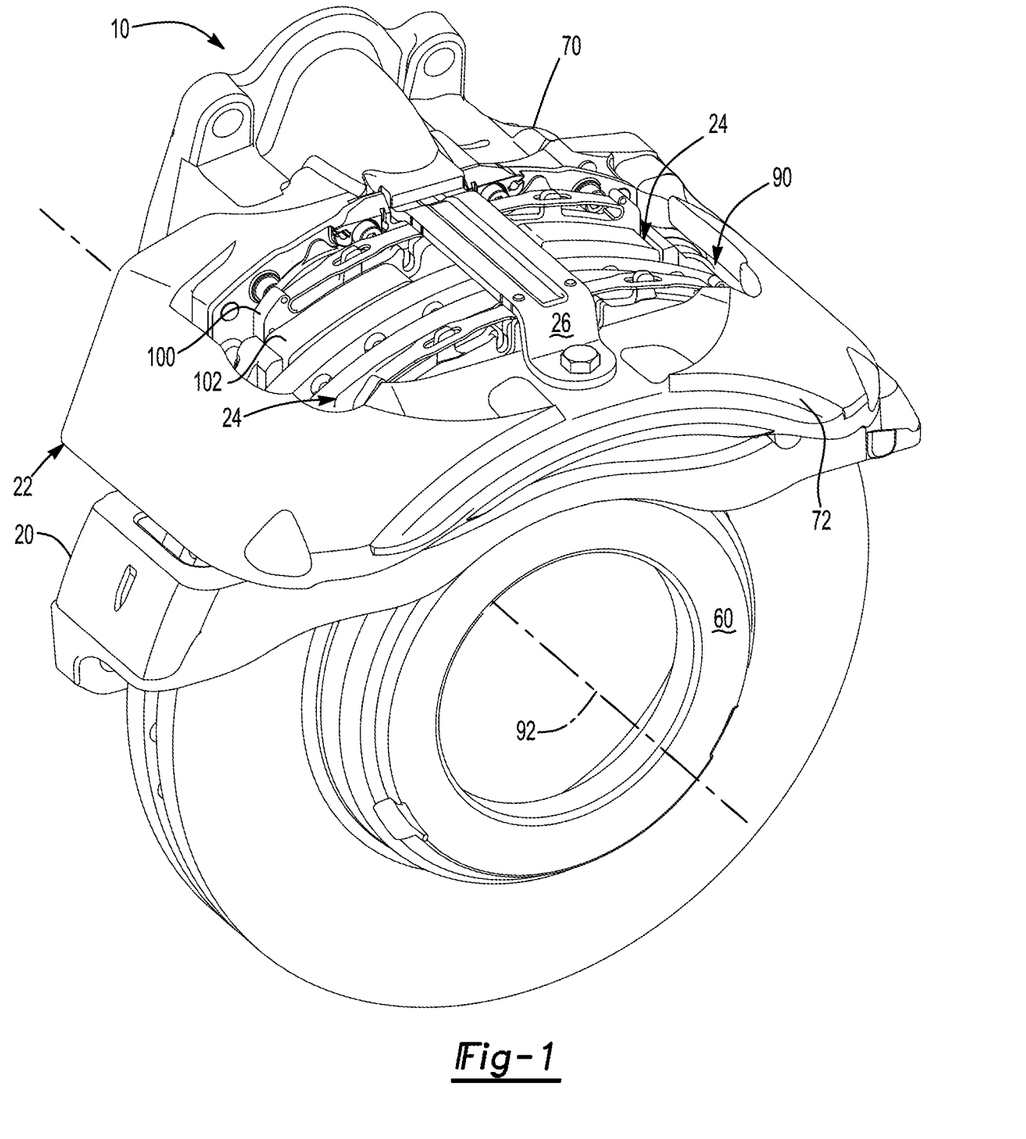
FIG. 1 is a perspective view of an example of a brake assembly.
Figure 4:
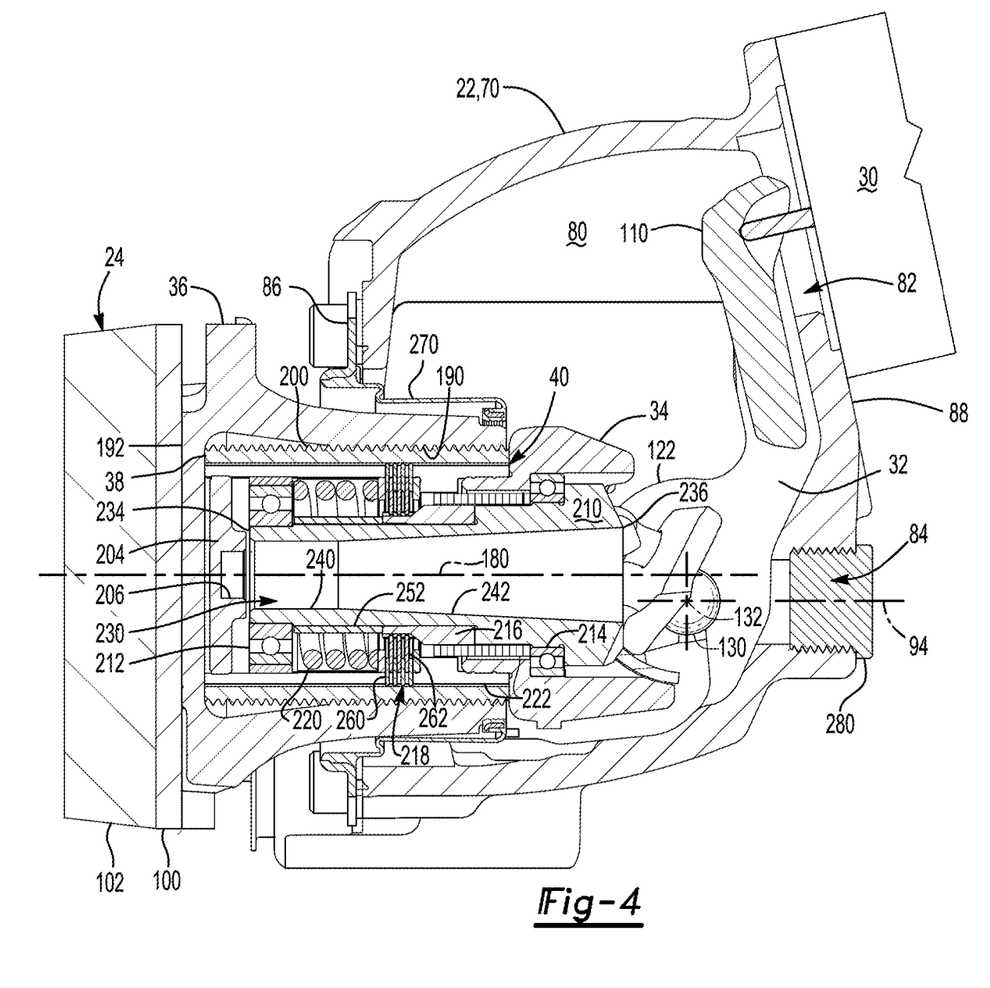
FIG. 4 is a section view of the brake assembly along section line 4-4.
Figure 6:
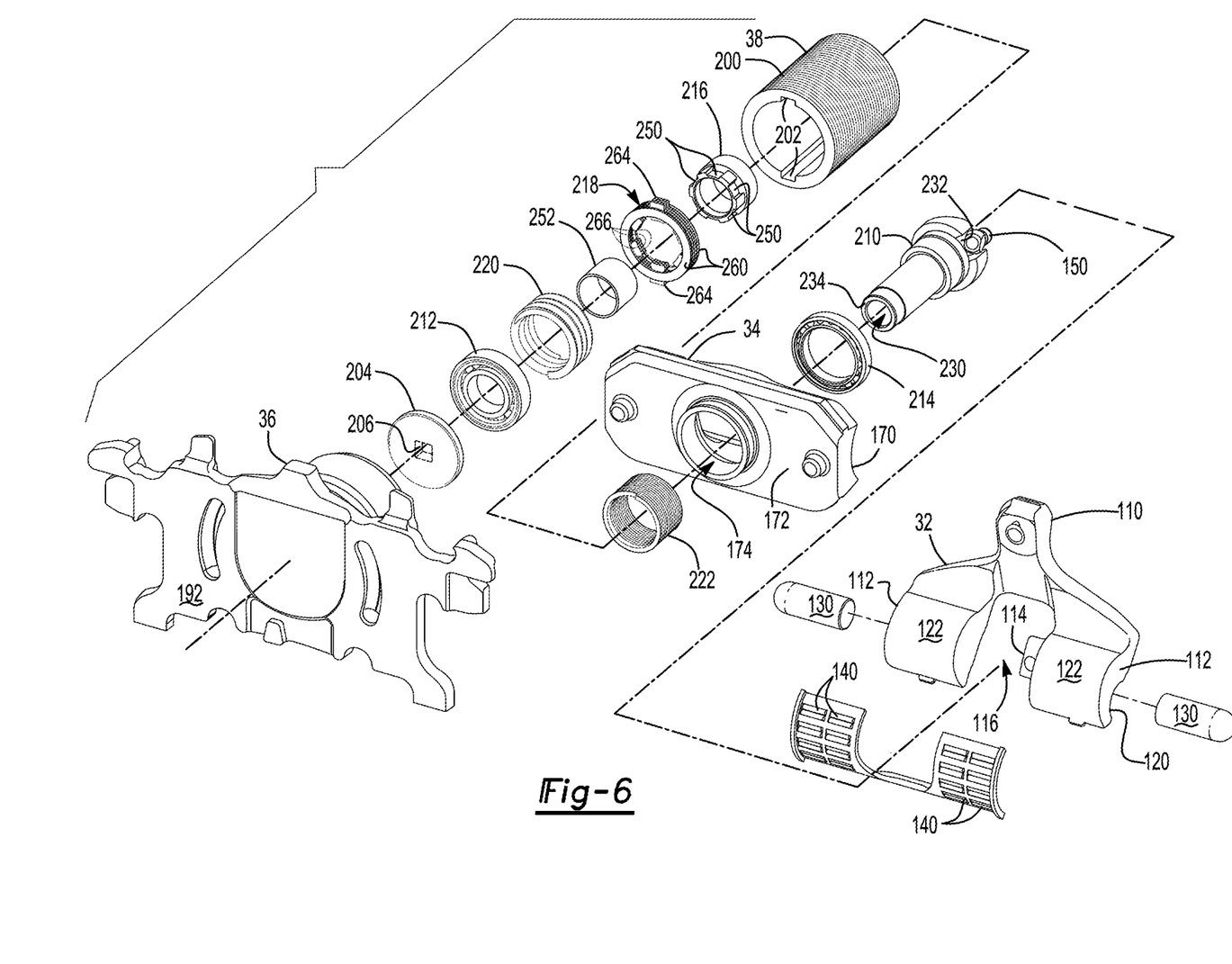
FIGS. 6 and 7 are exploded views of a portion of the brake assembly.

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. The brake assembly 10 may be configured as a disc brake. In at least one configuration, the brake assembly 10 may include a brake carrier 20, a brake caliper 22, a pair of brake pad assemblies 24, and optionally a retainer bracket 26. Referring primarily to FIGS. 4 and 6, the brake assembly 10 may include components that may facilitate movement of the brake pad assemblies 24, such as a brake actuator 30, an operating shaft 32, a yoke 34, a tappet 36, a piston 38, and a wear adjuster mechanism 40.

Referring to FIG. 1, the brake carrier 20 may be fixedly mounted to the vehicle. For example, the brake carrier 20 may be directly or indirectly mounted to an axle assembly or a steering knuckle. The brake carrier 20 may receive and support the brake pad assemblies 24 in a manner that permits the brake pad assemblies 24 to move along an axis toward and away from the brake rotor 60 while inhibiting rotation of the brake pad assemblies 24 about the axis. The brake carrier 20 may include a rotor opening that may receive a brake rotor 60. As such, the brake carrier 20 may straddle the brake rotor 60 and help position the brake pad assemblies 24 on opposite sides of the brake rotor 60.

Figure 2:
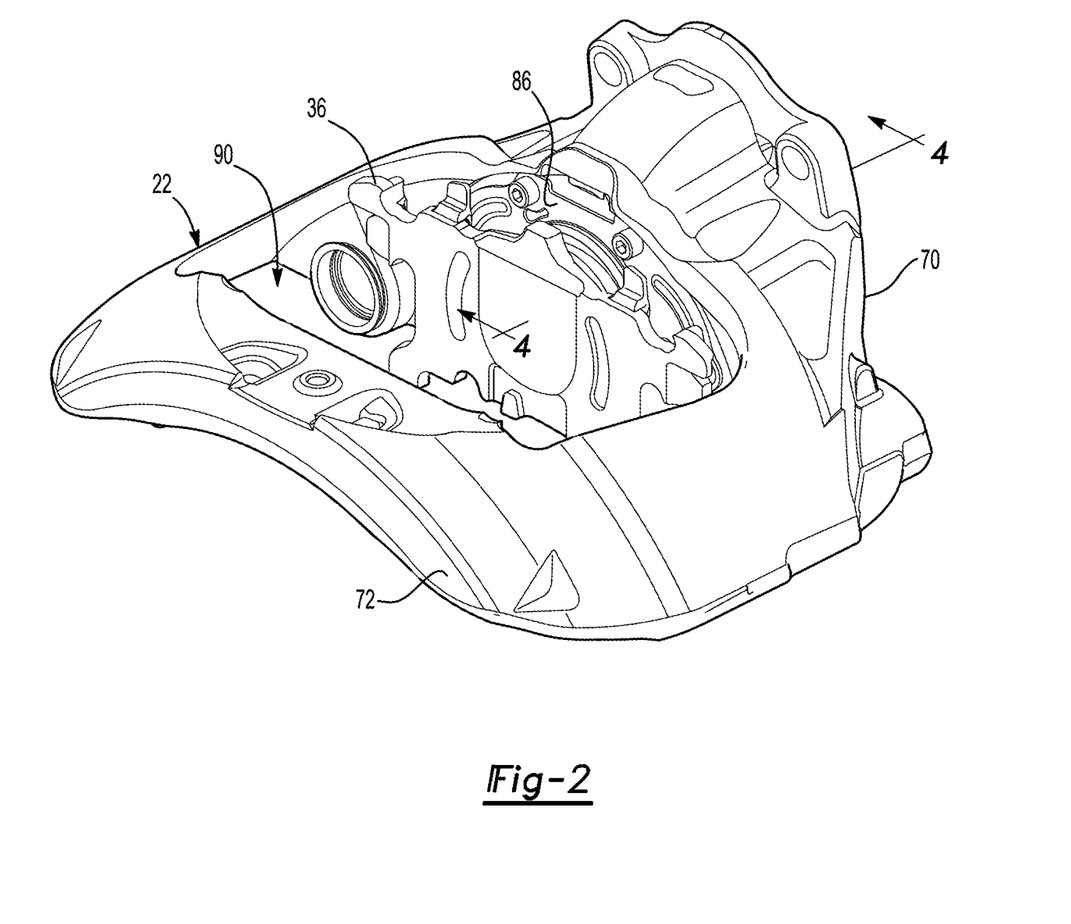
FIG. 2 is a perspective view of a portion of the brake assembly including an example of a brake caliper.

Referring to FIGS. 1 and 2, the brake caliper 22 may receive various components of the brake assembly 10. In addition, the brake caliper 22 may facilitate positioning of the brake pad assemblies 24 with respect to the brake rotor 60 to facilitate braking of the vehicle. In at least one configuration, the brake caliper 22 may be mounted to the brake carrier 20 and may include a caliper housing 70 and a caliper bridge 72.

The caliper housing 70 may be moveably disposed on the brake carrier 20. For example, the caliper housing 70 may be slidably disposed on a pair of guide pins that may be fixedly disposed on the brake carrier 20. As is best shown in FIG. 4, the caliper housing 70 may facilitate mounting of the brake actuator 30 and may define a cavity 80, an opening 82, and a hole 84.

The cavity 80 may receive or partially receive various components that facilitate movement of the brake pad assemblies 24, such as the operating shaft 32, yoke 34, tappet 36, piston 38, and the wear adjuster mechanism 40. The cavity 80 may have an aperture that may face toward the brake rotor 60 and that may be at least partially enclosed by a cover plate 86 that may be fixedly mounted to the caliper housing 70, such as with fasteners like bolts.

Figure 3:
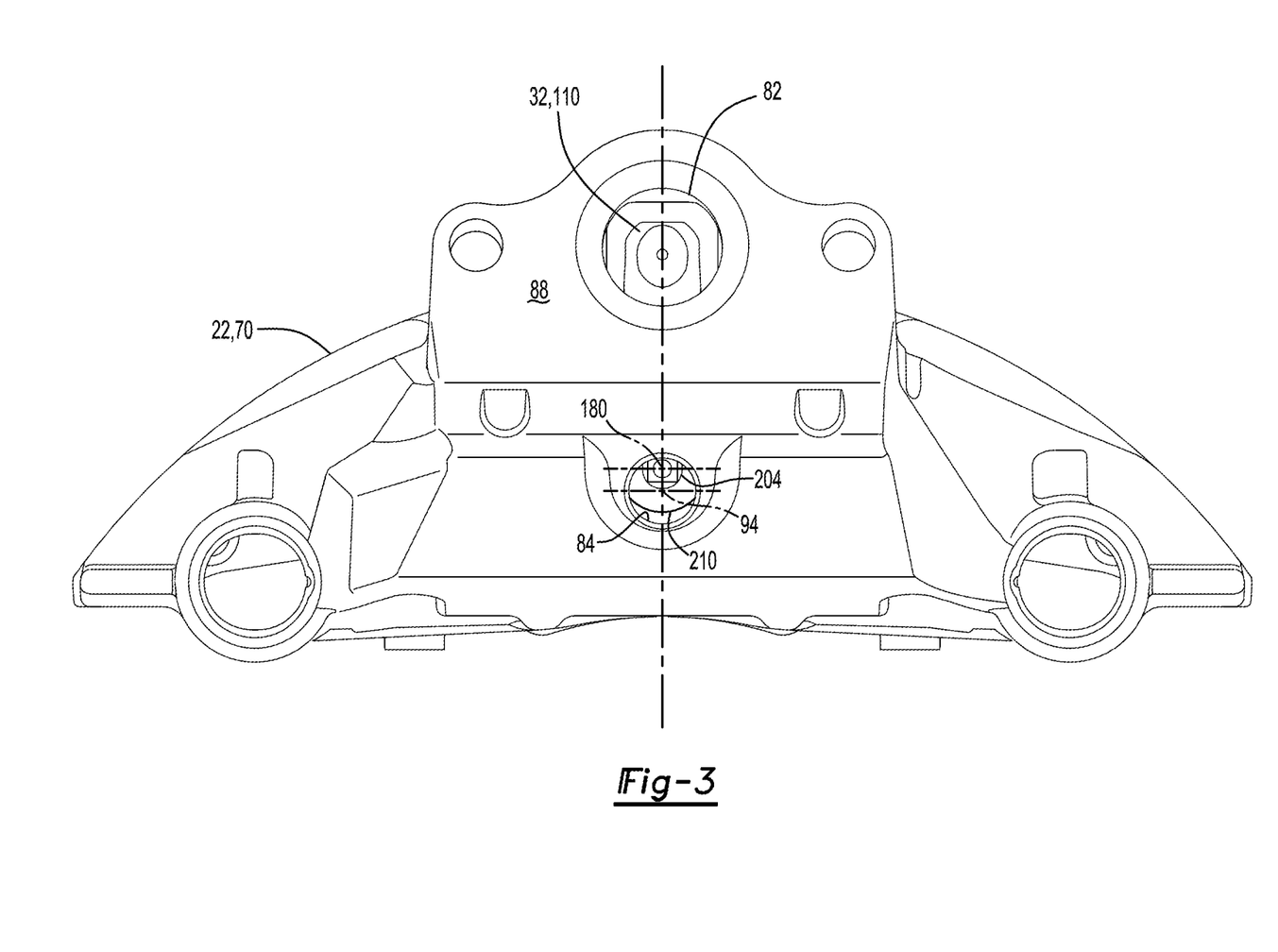
FIG. 3 is a rear side view of the portion of the brake assembly shown in FIG. 2.

Referring to FIGS. 3 and 4, the opening 82 may extend from the cavity 80 through a back wall 88 of the caliper housing 70 that may face away from the brake carrier 20 and the brake rotor 60. In at least one configuration, a shaft of the brake actuator 30 may extend through the opening 82 to facilitate actuation of the operating shaft 32. The opening 82 may be disposed above an axis 180.

The hole 84 may be a through hole that may extend from the cavity 80 through the back wall 88 of the caliper housing 70. The hole 84 may be spaced apart from the opening 82. The hole 84 may be sized such that the tool may be insertable and removeable through the hole 84 without disassembly of various components of the brake assembly 10 that facilitate movement of the brake pad assemblies 24, such as the wear adjuster mechanism 40. The hole 84 may be disposed above a brake rotor axis of rotation 92 and below the axis 180. For example, the hole 84 may be centered about a hole axis 94 that may be disposed above the brake rotor axis of rotation 92 and may be disposed below or may be otherwise offset from the axis 180. The hole 84 may receive a plug as will be discussed in more detail below.

Referring to FIGS. 1 and 2, the caliper bridge 72 may be integrally formed with or may be fixedly disposed on the caliper housing 70. For example, the caliper bridge 72 may be coupled to the caliper housing 70 with one or more fasteners, such as bolts. In at least one configuration, the caliper bridge 72 may cooperate with the caliper housing 70 to at least partially define an opening 90 that may facilitate insertion and removal of the brake pad assemblies 24.

Referring to FIG. 1, a pair of brake pad assemblies 24 may be received in and may be supported by the brake carrier 20. The brake pad assemblies 24 may be disposed on opposite sides of the brake rotor 60 and may be engageable with the brake rotor 60 to slow rotation of the brake rotor 60 and an associated wheel about a brake rotor axis of rotation 92. One brake pad assembly 24 may be positioned between the caliper housing 70 and the brake rotor 60 and may be referred to as an inboard brake pad assembly 24. The brake pad assembly 24 located on the opposite side of the brake rotor 60 may be positioned between the caliper bridge 72 and the brake rotor 60 and may be referred to as an outboard brake pad assembly 24. The brake pad assemblies 24 may include a backplate 100 and friction material 102.

The backplate 100 may be a structural member of a brake pad assembly 24. The backplate 100 may be configured as a generally flat plate and may be made of any suitable material, such as metal or a metal alloy. As is best shown in FIG. 4, a side of the backplate 100 that faces away from the friction material 102 may engage or contact the tappet 36.

The friction material 102 may be disposed on a side of the backplate 100 that may face toward the brake rotor 60. The friction material 102 may contact the brake rotor 60 during vehicle braking.

Referring to FIG. 1, the retainer bracket 26 may be removably mounted to the brake caliper 22. For example, the retainer bracket 26 may extend across the brake pad assemblies 24 and the opening 90 in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening 90.

Referring to FIG. 4, the brake actuator 30 may be mounted to the brake carrier 20. In at least one configuration, the brake actuator 30 may be mounted to the back wall 88 of the caliper housing 70 and may have a brake actuator shaft that may extend through the opening 82 in the caliper housing 70. The brake actuator shaft may engage the operating shaft 32 and may be moveable to rotate the operating shaft 32.

Figure 7:
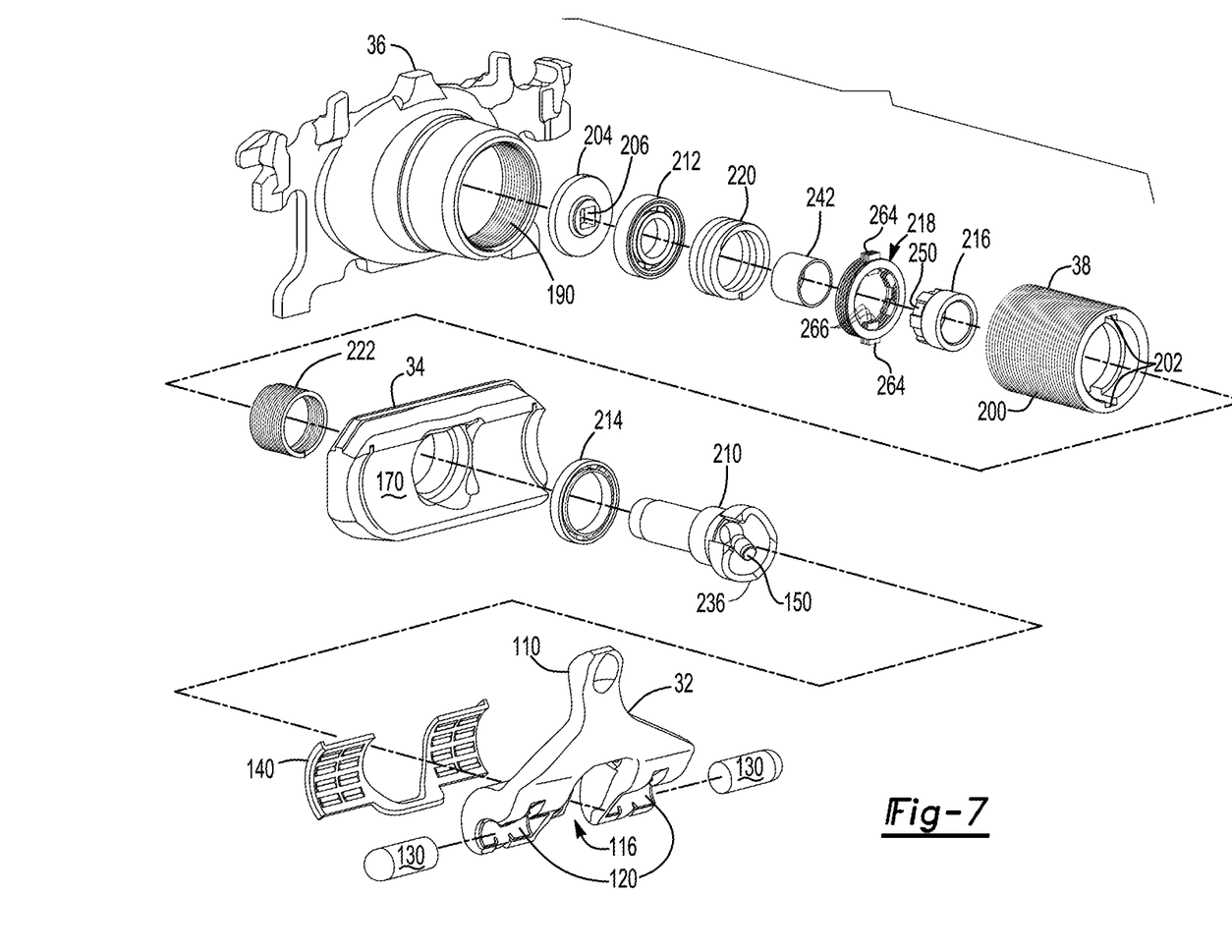

Referring to FIGS. 4, 6 and 7, the operating shaft 32 may transmit force from the brake actuator 30 other moveable components of the brake assembly 10. In at least one configuration, the operating shaft 32 may generally be configured as an inverted "Y" and may include a lever 110, a pair of cams 112, and a tab 114.

Referring to FIG. 4, the lever 110 may extend from the cams 112 toward the opening 82. The lever 110 may have a pocket that may receive an end of the brake actuator shaft.

Referring to FIGS. 6 and 7, the cams 112 may be spaced apart from each other such that a gap 116 is provided between the cams 112. In at least one configuration, the cams 112 may have mirror symmetry with respect to each other. In at least one configuration, a cam 112 may include a concave recess 120 and a convex surface 122.

The concave recess 120 may receive a corresponding roller 130. The roller 130 may be supported by a corresponding arcuate surface in the cavity 80 of the caliper housing 70 and may be rotatable about a roller axis of rotation 132, which is best shown in FIG. 4.

The convex surface 122 may be disposed opposite the concave recess 120. The convex surface 122 may engage a corresponding set of roller bearings 140 that may be disposed between the convex surface 122 and the yoke 34. The rollers 130 and roller bearings 140 may facilitate rotation of the operating shaft 32 about an axis of rotation. The operating shaft axis of rotation may be disposed at a radial centerline of the convex surface 122.

Referring to FIG. 6, a tab 114 may extend from at least one of the cams 112 into the gap 116. A ball pin 150 may be fixedly mounted to the tab 114 and may extend toward the wear adjuster mechanism 40 as will be discussed in more detail below. In at least one configuration, the ball pin 150 may have a generally spherical or rounded ball at its distal end.

Referring to FIGS. 4, 6 and 7, the yoke 34 may be disposed between the operating shaft 32 and the piston 38. In at least one configuration, the yoke 34 may include a concave surface 170, an engagement surface 172, and a through hole 174.

The concave surface 170 may face toward the operating shaft 32 and may engage the roller bearings 140.

The engagement surface 172 may be disposed opposite the concave surface 170. The engagement surface 172 may engage or contact an end of the piston 38.

The through hole 174 may be disposed proximate the center of the yoke 34 and may extend around an axis 180. The through hole 174 may receive at least a portion of the wear adjuster mechanism 40. The axis 180 may be offset from and may extend substantially parallel to the brake rotor axis of rotation 92.

Referring to FIGS. 4, 6 and 7, the tappet 36 may be moveable along the axis 180 with respect to the caliper housing 70. However, the brake carrier 20 may inhibit or prevent the tappet 36 from rotating about the axis 180. The tappet 36 may protrude away from the cavity 80 of the caliper housing 70 and may have a generally hollow body that may include an inner female thread 190 and an engagement face 192.

The inner female thread 190 may face toward the axis 180 and may extend around the axis 180.

The engagement face 192 may face away from the cavity 80. The engagement face 192 may engage or contact a brake pad assembly 24. For example, the engagement face 192 may engage or contact a side of the backplate 100 that may be disposed opposite the friction material 102.

Referring to FIGS. 4, 6 and 7, the piston 38 may be at least partially received inside the tappet 36. The piston 38 may be moveable along the axis 180. In addition, the piston 38 may be rotatable about the axis 180. In at least one configuration, the piston 38 may have a hollow tubular configuration that may include an outer female thread 200, at least one recess 202, and an end cap 204. The brake assembly 10 may be provided with a single piston 38 in one or more configurations.

The outer female thread 200 may face away from the axis 180 and may extend around the axis 180. The outer female thread 200 may mate with the inner female thread 190 of the tappet 36. As such, the tappet 36 and the piston 38 may have mating threads.

Referring to FIGS. 6 and 7, at least one recess 202 may be provided in an inner surface of the piston 38 that may be disposed opposite the outer female thread 200 and that may face toward the axis 180. In the configuration shown, two recesses 202 are provided that are disposed opposite each other and extend the length of the piston 38. The recesses 202 may facilitate mounting of a disc pack of the wear adjuster mechanism 40 as will be discussed in more detail below.

Referring to FIGS. 4, 6 and 7, the end cap 204 may be disposed at an end of the piston 38 that may face toward the brake pad assembly 24 and the tappet 36. The end cap 204 may be integrally formed with the body of the piston 38 or may be provided as a separate component. In the configuration shown, the end cap 204 is provided as a separate component that may be received in the hollow body of the piston 38. The end cap 204 may be fixed to the piston 38 such that the piston 38 is not rotatable with respect to the end cap 204. In at least one configuration, the end cap 204 may include an engagement feature 206. The engagement feature 206 may have any suitable configuration. For instance, the engagement feature 206 may have a male configuration, a female configuration, or combinations thereof. In the configuration shown, the engagement feature 206 is illustrated as having a female configuration that is configured as a blind hole; however, it is contemplated that such an engagement feature may be configured as a through hole rather than a blind hole. The engagement feature 206 may have any suitable shape or cross-section that may be compatible with a tool as will be discussed in more detail below. For instance, the engagement feature 206 may have multiple sides (e.g., may be slotted or may have a configuration such as a cross, triangular, square, hexagonal, Torx®, etc.). In at least one configuration, the axis 180 may extend through the engagement feature 206.

Referring to FIG. 4, the wear adjuster mechanism 40 may be configured to maintain a desired running clearance between the brake pad assemblies 24 and the brake rotor 60 when the brake pad assemblies 24 are retracted. As an overview, the wear adjuster mechanism 40 may include a one-way clutch that may permit the axial position of a brake pad assembly along the axis 180 to be adjusted or move closer to the brake rotor 60 in response to wear of the friction material 102. The wear adjuster mechanism 40 may be provided in various configurations, some examples of which are disclosed in United States Patent Publication No. 2019/0024740, which is hereby incorporated by reference in its entirety. The wear adjuster mechanism 40 may be at least partially received inside the piston 38. In at least one configuration and as is best shown with reference to FIGS. 4, 6 and 7, the wear adjuster mechanism 40 may include a shaft 210, a first bearing assembly 212, a second bearing assembly 214, a drum 216, a disc pack 218, a first biasing member 220, and a second biasing member 222.

Referring to FIGS. 4, 6 and 7, the shaft 210 may be at least partially received in the cavity 80 of the caliper housing 70. The shaft 210 may be disposed in the through hole 174 of the yoke 34 and inside the hole or cavity of the piston 38. In addition, the shaft 210 may be spaced apart from the yoke 34 and the piston 38. The shaft 210 may be rotatable about the axis 180 and may define a shaft cavity 230 and a ball pin engagement feature 232.

The shaft cavity 230 may extend along the axis 180 and may be centered about the axis 180. In at least one configuration, the shaft cavity 230 may be configured as a through hole that may extend along the axis 180 from a first end 234 of the shaft 210 to a second end 236 of the shaft 210 that may be disposed opposite the first end 234 of the shaft 210. The first end 234 may face toward the end cap 204 and may face away from the hole 84 in the caliper housing 70. The second end 236 may be disposed opposite the first end 234 and may face away from the end cap 204 and may face toward the hole 84. The portion of the shaft cavity 230 that may be received inside the yoke 34 may have a larger diameter or may extend further from the axis 180 than a portion of the shaft cavity 230 that may be received inside the piston 38.

The shaft cavity 230 may have any suitable configuration. For instance, the shaft cavity 230 may not have a constant cross-section or a constant diameter from the first end 234 to the second end 236. For instance, the shaft cavity 230 may be sized or configured such that the shaft 210 is disposed closer to the axis 180 at the first end 234 than at the second end 236 or such that the shaft cavity 230 extends further from the axis 180 at the second end 236 than at the first end 234. Such a configuration may facilitate insertion of a tool as will be discussed in more detail below. In at least one configuration, the shaft cavity 230 may have a first portion 240 and a second portion 242.

The first portion 240 may have a different cross-sectional shape, a different size, or both, as compared to the second portion 242. The first portion 240 may extend from the first end 234 or may be disposed closer to the first end 234 than the second portion 242. In the configuration shown, the first portion 240 is illustrated as being disposed closer to the axis 180 than the second portion 242. The first portion 240 may have any suitable shape. For instance, the first portion 240 may have a cylindrical configuration.

The second portion 242 may extend between the first portion 240 and the second end 236. For instance, the second portion 242 may extend from an end of the first portion 240 toward the second end 236 or to the second end 236. In the configuration shown, the second portion 242 is illustrated as being disposed further from the axis 180 than the first portion 240. The second portion 242 may have any suitable shape. For example, the second portion 242 may have a tapered conical configuration that may become progressively larger or may increase in diameter in an axial direction that may extend from the first end 234 toward the second end 236. As such, the shaft cavity 230 may be tapered between the first end 234 and the second end 236. It is also contemplated that the second portion 242 may not have a tapered conical configuration that may have a different configuration that increase the size of the shaft cavity 230 or distance from the axis 180 at the second end 236 as compared to the first end 234. For instance, the second portion 242 may include a plurality of different sized portions or step configuration in which the diameter of the shaft cavity 230 or distance from the axis 180 is greater at the second end 236 as compared to one or more portions that are axially positioned further from the second end 236. In at least one configuration, the second portion 242 may have a greater axial length or extend further along the axis 180 than the first portion 240. It is also contemplated that the first portion 240 may be omitted and the second portion 242 may extend to the first end 234 rather than to the first portion 240.

Referring primarily to FIG. 6, the ball pin engagement feature 232 may be configured to engage the ball pin 150. The ball pin engagement feature 232 may be disposed at an end of the shaft 210 that may face toward the operating shaft 32 and may be offset from the axis 180. In the configuration shown, the ball pin engagement feature 232 is configured as a recess that may receive the ball pin 150. The ball pin 150 may extend at an angle with respect to the axis 180 such that rotation of the operating shaft 32 may cause the ball pin 150 to engage a side or surface of the ball pin engagement feature 232 in a manner that may rotate the shaft 210 about the axis 180. It is also contemplated that the ball pin engagement feature 232 may have a male configuration and the ball pin 150 may have a female configuration in other configurations.

Referring to FIGS. 4, 6 and 7, the first bearing assembly 212 may rotatably support the shaft 210. The first bearing assembly 212 may be disposed proximate a first end of the shaft 210 and may receive the shaft 210. For instance, the first bearing assembly 212 may extend around the shaft 210 and may be received inside the piston 38. As such, the first bearing assembly 212 may extend from the shaft 210 to or toward the inner surface of the piston 38.

The second bearing assembly 214 may rotatably support the shaft 210. The second bearing assembly 214 may be disposed proximate a second end of the shaft 210 and may receive the shaft 210. For instance, the second bearing assembly 214 may extend around the shaft 210 and may be received inside the through hole 174 of the yoke 34. As such, the second bearing assembly 214 may extend from the shaft 210 to or toward the yoke 34.

The drum 216 may be received inside the piston 38 and may be spaced apart from the piston 38. The drum 216 may extend around and may receive a portion of the shaft 210. In addition, the shaft 210 may be selectively rotatable about the axis 180 with respect to the drum 216 as will be discussed in more detail below. In at least one configuration, the drum 216 may have a hollow tubular construction that may include at least one recess 250. As is best shown in FIG. 6, a plurality of recesses 250 are arranged around an exterior side of the drum 216 that faces away from the axis 180. The recesses 250 may extend from an end of the drum 216 that may face toward the tappet 36 toward an opposite end of the drum 216. The recesses 250 may facilitate mounting of the disc pack 218. As is best shown in FIG. 4, axial movement of the drum 216 may be constrained by the shaft 210 and by a spacer 252 that may extend from an end of the drum 216 to the first bearing assembly 212.

Referring to FIGS. 4, 6 and 7, the disc pack 218 may selectively couple the piston 38 and the drum 216. The disc pack 218 may include a plurality of discs that may include at least one outer disc 260 and at least one inner disc 262. As is best shown in FIGS. 6 and 7, the outer discs 260 may have at least one tab 264 that may be received in a recess 202 of the piston 38. As such, the outer discs 260 may be rotatable about the axis 180 with the piston 38. The inner discs 262 may have at least one tab 266 that may be received in a recess 250 of the drum 216. As such, the inner discs 262 may be rotatable about the axis 180 with the drum 216. The outer discs 260 and the inner discs 262 may be arranged in an alternating order in an axial direction or in a direction that extends along the axis 180. For instance, at least one inner disc 262 may be axially positioned between two adjacent outer discs 260 or vice versa. The piston 38 may be rotatable about the axis 180 with the drum 216 when the discs of the disc pack 218 are sufficiently compressed such that the outer discs 260 and the inner discs 262 do not slip with respect to each other. Conversely, the drum 216 may be rotatable with respect to the piston 38 when the discs of the disc pack 218 are not sufficiently compressed or when the outer discs 260 and the inner discs 262 slip with respect to each other.

Referring to FIGS. 4, 6 and 7, the first biasing member 220 may exert a biasing force on the disc pack 218. The first biasing member 220 may have any suitable configuration. For instance, the first biasing member 220 may be configured as a spring that may extend from the first bearing assembly 212 to the disc pack 218 and that may exert a biasing force on the disc pack 218 in a direction that may extend toward the yoke 34. As such, the first biasing member 220 may compress the discs of the disc pack 218.

The second biasing member 222 may selectively couple the shaft 210 and the drum 216. The second biasing member 222 may have any suitable configuration. For example, the second biasing member 222 may be configured as a wrap spring that may be axially positioned between the disc pack 218 and the second bearing assembly 214. The second biasing member 222 may be partially received inside the yoke 34 and may be partially received inside the piston 38. The second biasing member 222 may extend around the shaft 210 and may extend around a portion of the drum 216. The second biasing member 222 may be configured to slip and allow the shaft 210 to rotate with respect to the drum 216 and the piston 38 when the brake is released or braking is disengaged as will be discussed in more detail below.

One or more retraction springs may be provided to facilitate retraction of the brake pad assemblies 24. A retraction spring may be received in the cavity 80 of the caliper housing 70 and may extend from the yoke 34 to the cover plate 86. The retraction spring may be configured to actuate the yoke 34 away from the cover plate 86 since the cover plate 86 is fixed to the caliper housing 70. As such, the retraction spring may urge the yoke 34 to move along the axis 180 in a direction that extends away from the brake rotor 60 and the cover plate 86.

Referring to FIG. 4, operation of the brake assembly 10 will now be described in more detail. As an overview, the brake assembly 10 may start in a retracted state in which braking of the vehicle is not requested. As such, the brake pad assemblies 24 may be retracted away from the brake rotor 60 and components of the brake assembly 10 may be positioned as shown. Braking may be initiated in response to a vehicle braking command, such as may be provided by an input device like a brake pedal or sensor that may trigger braking of the vehicle, such as an adaptive cruise control system or a proximity sensor that may detect an object or obstruction in front of the direction of travel of the vehicle. The brake actuator 30 may be operated to extend the brake actuator shaft, thereby rotating the operating shaft 32 about its axis of rotation in a first direction or a counterclockwise direction from the perspective shown. Rotation of the operating shaft 32 may move the yoke 34, tappet 36, piston 38, wear adjuster mechanism 40, and the inboard brake pad assembly 24 that is disposed adjacent to the tappet 36 along the axis 180 toward the brake rotor 60 or to the left from the perspective shown. Movement of the yoke 34 toward the brake rotor 60 may compress the retraction springs. In addition, rotation of the operating shaft 32 may cause the ball pin 150 to engage the ball pin engagement feature 232 of the shaft 210, which may rotate the shaft 210 about the axis 180. Once the inboard brake pad assembly 24 contacts the brake rotor 60 a reaction force may then move the brake caliper 22 with respect to the brake carrier 20 to actuate the outboard brake pad assembly 24 that is disposed between the brake rotor 60 and the caliper bridge 72 into engagement with an opposite side of the brake rotor 60 to help slow rotation of the brake rotor 60 and an associated vehicle wheel. Retracting the brake actuator shaft may allow the operating shaft 32 to rotate about its axis of rotation in a clockwise direction from the perspective shown, which in turn may allow the actuation sequence to proceed in reverse under the biasing force of the retraction springs.

Rotation of the operating shaft 32 may or may not result in adjustment of the running clearance between the brake pad assembly 24 and the brake rotor 60. For example, rotation of the operating shaft 32 in the first direction may operate the wear adjuster mechanism 40 to extend the tappet 36 closer to the brake rotor 60 with respect to the piston 38 when the operating shaft 32 and the ball pin 150 rotate the shaft 210 about the axis 180 before the inboard brake pad assembly 24 contacts the brake rotor 60. As such, the shaft 210 and the drum 216 may rotate together about the axis 180 due to the force exerted by the second biasing member 222. Rotation of the drum 216 may cause the piston 38 to rotate about the axis 180 due to the coupling provided by the disc pack 218. Rotation of the piston 38 may extend the tappet 36 (i.e., extend the tappet 36 further away from the yoke 34 and closer to the brake rotor 60) due to the mating of the outer female thread 200 of the piston 38 and the inner female thread 190 of the tappet 36. For example, rotation of the piston 38 may cause the tappet 36 to extend to the left from the perspective shown with respect to the piston 38 due to operation of the mating threads since the tappet 36 is inhibited from rotating about the axis 180 by the brake carrier 20. Extension of the tappet 36 with respect to the piston 38 may stop when the inboard brake pad assembly 24 contacts the brake rotor 60. For example, the torque required to rotate the piston 38 increases substantially when the inboard brake pad assembly 24 contacts the brake rotor 60 even when the brake actuator 30 continues to rotate the operating shaft 32 and hence continues to rotate the shaft 210. As a result, the discs of the disc pack 218 may slip with respect to each other, thereby permitting rotation of the shaft 210 with respect to the piston 38.

The wear adjuster mechanism 40 may operate to hold the tappet 36 in its adjusted position when the brake pad assemblies 24 are retracted. For example, when the brake actuator 30 is retracted the operating shaft 32 may rotate in a second direction that is disposed opposite the first direction, or clockwise from the perspective shown. The ball pin 150 may then rotate the shaft 210 in the opposite direction back to its previous rotational position. However, the force exerted by the disc pack 218 may exceed the force exerted by the second biasing member 222. As a result, the disc pack 218 may inhibit rotation of the piston 38 about the axis 180 with respect to the drum 216 while the second biasing member 222 may slip or allow the shaft 210 to rotate about the axis 180 in the second direction with respect to the drum 216 and back to its previous position.

Rotation of the operating shaft 32 may not result in adjustment of the running clearance between the brake pad assembly 24 and the brake rotor 60 when the inboard brake pad assembly 24 contacts the brake rotor 60 before the operating shaft 32 and the ball pin 150 rotate the shaft 210 about the axis 180. As previously discussed, the torque required to rotate the piston 38 increases substantially when the inboard brake pad assembly 24 contacts the brake rotor 60. As a result, the discs of the disc pack 218 may slip with respect to each other as the operating shaft 32 rotates in the first direction, thereby permitting rotation of the shaft 210 with respect to the piston 38 while rotation of the piston 38 is opposed by the tappet 36 reacting against the brake rotor 60. The wear adjuster mechanism 40 may operate to hold the tappet 36 in its current position when the brake pad assemblies 24 are retracted (e.g., the disc pack 218 may inhibit rotation of the piston 38 about the axis 180 while the second biasing member 222 may slip or allow the shaft 210 to rotate about the axis 180 and back to its previous position as previously described).

Referring to FIG. 4, the cavity 80 inside the caliper housing 70 may be sealed from the surrounding environment to inhibit moisture or water from entering the cavity 80. For example, the brake actuator 30 and the cover plate 86 may directly or indirectly seal against the caliper housing 70, such as with an intervening seal or gasket that may facilitate sealing of a corresponding opening of the caliper housing 70. Similarly, a flexible boot 270 may extend from the tappet 36 to the caliper housing 70 and/or the cover plate 86 to provide sealing between the tappet 36 and the caliper housing 70 while accommodating movement of the tappet 36. In addition, the hole 84 in the caliper housing 70 may receive a component such as a plug 280 that may facilitate sealing of the hole 84. The plug 280 may be coupled to the caliper housing 70 in any suitable manner, such as with mating threads, an interference fit, or with another component that helps secure the plug 280.

Figure 5:
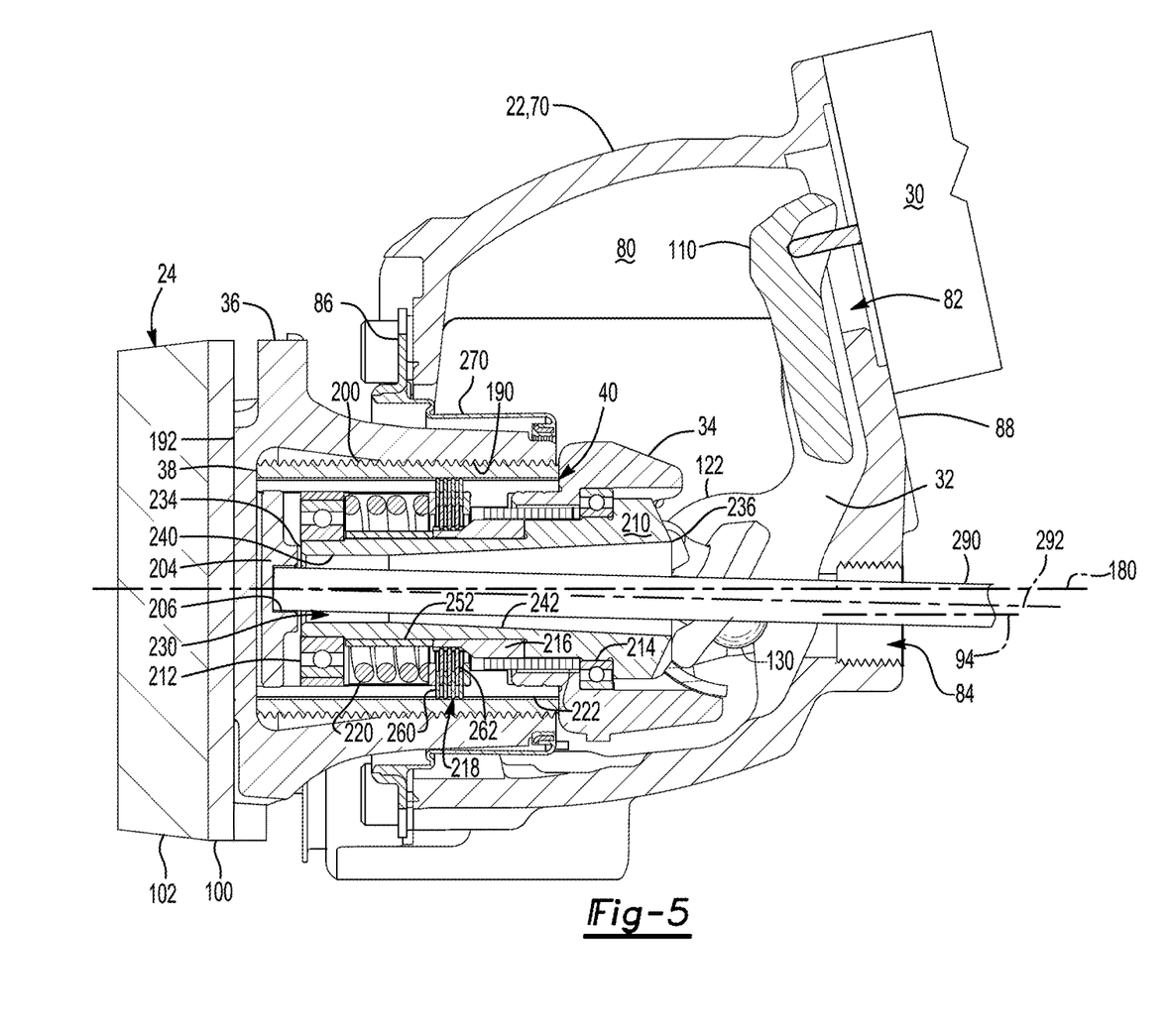
FIG. 5 is a section view of the brake assembly along section line 4-4 with a plug removed and a tool inserted into a caliper housing.

Referring to FIG. 5, a method of adjusting a brake assembly will now be described. The brake assembly 10 may be mounted on a vehicle when an adjustment is made.

First, the plug 280 may be removed from the hole 84 in the caliper housing 70, thereby providing access to the cavity 80. Removal of the plug 280 is best understood by comparing FIG. 4, which shows the plug 280 installed in the hole 84, with FIG. 5, in which the plug 280 is not present.

Next, a tool 290 may be inserted as shown in FIG. 5. The tool 290 may be inserted into the hole 84 in the caliper housing 70 and into the shaft cavity 230 of the shaft 210 of the wear adjuster mechanism 40. For instance, the tool 290 may extend from outside the caliper housing 70 through the hole 84, through the shaft cavity 230, and to the end cap 204. The tool 290 may be of any suitable type. For instance, the tool 290 may be a rod, lever, Allen wrench, screwdriver, Torx® wrench, ball driver, socket or the like. At least a portion of the tool 290 may extend along and may be rotatable about a tool axis 292. In FIG. 5, the tool 290 and the tool axis 292 are disposed in a nonparallel relationship with the axis 180. Such a configuration may be provided when the hole 84 is not aligned with or is not centered about the axis 180. The tool 290 may be rotatable about the tool axis 292 but may not be rotatable about the axis 180 when the tool axis 292 is offset from or is not coaxial with the axis 180. It is also contemplated that the tool 290, the tool axis 292, or both may extend along the axis 180 in one or more embodiments, such as when the hole 84 is centered about the axis 180 or is sized such that the tool axis 292 can be coaxial with the axis 180.

The tool 290 may be inserted such that the tool 290 may engage or contact the end cap 204. For instance, an end of the tool 290 may mate with a corresponding engagement feature 206 of the end cap 204. The tool 290 may have any configuration that may be compatible with the engagement feature 206. As one example, the tool 290 may have a male configuration that may mate with and may be received in an engagement feature 206 on the end cap 204 that may have a female configuration. Alternatively, the tool 290 may have a female configuration that may mate with and may receive an engagement feature 206 of the end cap 204 that may have a male configuration. For instance, the tool 290 may be configured as a socket that may receive the engagement feature 206.

Next, the tool 290 may be rotated about the tool axis 292. Rotating the tool 290 about the tool axis 292 may rotate the end cap 204 and the piston 38 about the axis 180 when sufficient torque is provided to override the automatic operation of the wear adjuster mechanism 40. Rotation of the piston 38 in turn may rotate the tappet 36 and hence may adjust the axial position of the tappet 36 with respect to the piston 38. For instance, rotating the tool 290 in a first rotational direction about the tool axis 292 may extend the tappet 36 while rotating the tool 290 in a second rotational direction that may be disposed opposite the first rotational direction may retract the tappet 36. The tool 290 may be rotated until a desired position of the tappet 36 is attained. The desired position of the tappet 36 may be determined or measured directly or indirectly. As one example, the tool 290 may be rotated until the side of the tappet 36 that faces toward the brake rotor 60 is a predetermined distance from the brake rotor 60. Such rotation may occur when a brake pad assembly 24 is removed from or installed in the brake assembly 10. As another example, the tool 290 may be rotated until the friction material 102 of a brake pad assembly 24 is a predetermined distance from the brake rotor 60. The predetermined distance between the friction material 102 and an adjacent side of the brake rotor 60 when braking is not applied (e.g., when the brake actuator 30 is retracted) may be referred to as a running clearance. As such, rotating the tool 290 may facilitate manual adjustment of the running clearance between an installed brake pad assembly 24 and the brake rotor 60. The running clearance may be manually adjusted when the brake assembly 10 is serviced or when one or more brake pad assemblies 24 are replaced. Manual adjustment may be accomplished by rotating the tool 290 by hand or by rotating the tool 290 with another tool or mechanism, such as a power tool like a power screwdriver, drill, or the like. The source of torque for rotating the tool 290 may be located outside of the caliper housing 70.

Next, the tool 290 may be removed after adjustment is complete. For instance, the tool 290 may be disengaged from the end cap 204 and may be extracted back through and out of the shaft cavity 230 and the hole 84 in the caliper housing 70.

Finally, the plug 280 may be reinstalled in the hole 84 after the tool 290 has been removed. Reinstalling the plug 280 may help isolate the cavity 80 from the surrounding environment. For instance, the plug 280 may help seal against the caliper housing 70 to prevent contaminants, such as water or particulates, from entering the cavity 80.

The brake assembly and method described above may allow a brake assembly to be provided without a manual adjustment shaft that is a self-contained in the brake assembly or installed during initial assembly of the brake assembly, which may help reduce weight and may eliminate components that are needed to support such a shaft. Moreover, sealing of the caliper housing may be improved or simplified as sealing with respect to such an adjustment shaft may be eliminated. For instance, a static plug may replace a moveable or rotatable seal that may be associated with such an adjustment shaft. The brake assembly and method may allow a tool to be installed and rotated at various angles and may enable better access for making manual brake adjustments. Moreover, the tool may provide torque to a piston without intermediate gears. Furthermore, the potential for inadvertently adjusting is reduced as a tool must be intentionally installed for manual adjustments to be made.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for adjusting a brake assembly comprising:
inserting a tool through a through hole in a caliper housing and into a shaft cavity of a shaft of a wear adjuster mechanism that is configured to adjust a running clearance of a brake pad assembly, wherein the shaft is at least partially received inside a piston that is rotatable about an axis and is at least partially received inside a tappet that is adapted to engage the brake pad assembly;
engaging the tool with an end cap that is fixedly mounted to the piston;
rotating the tool to rotate the piston to manually adjust a position of the tappet with respect to the piston; and
removing the tool from the shaft cavity and the caliper housing after rotating the tool, wherein the through hole is centered about a hole axis that is disposed parallel to and does not intersect the axis.

2. The method of claim 1 further comprising removing a plug from the through hole of the caliper housing before inserting the tool.

3. The method of claim 2 further comprising inserting the plug into the through hole after removing the tool.

4. The method of claim 1 wherein engaging the tool with the end cap further comprises inserting the tool into an engagement feature that is defined by the end cap.

5. The method of claim 4 wherein the engagement feature is a blind hole.

6. The method of claim 1 wherein the tool is disposed in a nonparallel relationship with the axis.

7. The method of claim 1 wherein the shaft is rotatable about the axis and the tool is rotatable about a tool axis that is disposed in a nonparallel relationship with the axis.

8. The method of claim 1 wherein the tool is rotatable about a tool axis and is not rotatable about the axis.

9. The method of claim 1 wherein the shaft cavity extends from a first end of the shaft that faces away from the through hole to a second end that is disposed opposite the first end, wherein the shaft is disposed closer to the axis at the first end than at the second end.

10. A method for adjusting a brake assembly comprising:
inserting a tool through a through hole in a caliper housing and into a shaft cavity of a shaft of a wear adjuster mechanism that is configured to adjust a running clearance of a brake pad assembly, wherein the shaft is at least partially received inside a piston that is rotatable about an axis and is at least partially received inside a tappet that is adapted to engage the brake pad assembly;
engaging the tool with an end cap that is fixedly mounted to the piston;
rotating the tool to rotate the piston to manually adjust a position of the tappet with respect to the piston; and
removing the tool from the shaft cavity and the caliper housing after rotating the tool, wherein the shaft cavity extends from a first end of the shaft that faces away from the through hole to a second end that is disposed opposite the first end, the shaft is disposed closer to the axis at the first end than at the second end, and the shaft cavity has a tapered conical configuration between the first end and the second end.

11. The method of claim 1 wherein the shaft cavity extends from a first end of the shaft that faces away from the through hole to a second end that is disposed opposite the first end, wherein the shaft cavity has a first portion that extends from the first end toward the second end and a second portion that extends from the first portion toward the second end.

12. The method of claim 11 wherein the first portion has a cylindrical configuration and the second portion has a tapered conical configuration.

13. A brake assembly comprising:
a caliper housing having a cavity and a through hole that extends from the cavity;
a tappet that is moveable along an axis with respect to the caliper housing and adapted to engage a brake pad assembly;
a piston that is rotatable about the axis and is at least partially received in the tappet, wherein the piston and tappet have mating threads;
an end cap that is fixedly mounted to the piston; and
a wear adjuster mechanism that is at least partially received inside the piston, the wear adjuster mechanism including a shaft that is rotatable about the axis, wherein the shaft defines a shaft cavity that extends from a first end of the shaft that faces toward the end cap to a second end of the shaft that is disposed opposite the first end, wherein the shaft cavity extends further from the axis at the second end than at the first end, and wherein the through hole is centered about a hole axis that is disposed parallel to and does not intersect the axis.

14. The brake assembly of claim 13 wherein the shaft cavity is centered about the axis.

15. The brake assembly of claim 13 wherein the shaft cavity is tapered between the first end and the second end.

16. The brake assembly of claim 13 wherein the shaft cavity has a first portion that extends from the first end and a second portion that extends from the second end to the first portion, wherein the second portion is disposed further from the axis than the first portion.

17. The brake assembly of claim 16 wherein the first portion has a cylindrical configuration and the second portion has a tapered conical configuration.

18. The brake assembly of claim 13 wherein a tool extends from outside the caliper housing, through the shaft cavity, and to the end cap.

19. The brake assembly claim 18 wherein the tool extends along a tool axis that is disposed in a nonparallel relationship with the axis.

20. The brake assembly of claim 13 wherein the shaft cavity has a tapered conical configuration between the first end and the second end.

* * * * *